US009104876B1

(12) United States Patent
Summers

(10) Patent No.: US 9,104,876 B1
(45) Date of Patent: Aug. 11, 2015

(54) VIRTUAL FILE-BASED TAMPER RESISTANT REPOSITORY

(71) Applicant: FLEXERA SOFTWARE LLC, Itasca, IL (US)

(72) Inventor: Stuart Summers, Reading (GB)

(73) Assignee: FLEXERA SOFTWARE LLC, Itasca, IL (US)

( * ) Notice: Subject to any disclaimer, the term of this patent is extended or adjusted under 35 U.S.C. 154(b) by 0 days.

(21) Appl. No.: 14/606,860

(22) Filed: Jan. 27, 2015

Related U.S. Application Data

(60) Provisional application No. 61/933,247, filed on Jan. 29, 2014.

(51) Int. Cl.
G06F 21/57 (2013.01)
G06F 21/62 (2013.01)
G06F 17/30 (2006.01)

(52) U.S. Cl.
CPC .......... *G06F 21/57* (2013.01); *G06F 17/30233* (2013.01); *G06F 21/62* (2013.01)

(58) Field of Classification Search
CPC .... G06F 21/57; G06F 21/62; G06F 17/30233
See application file for complete search history.

(56) References Cited

U.S. PATENT DOCUMENTS

| 5,825,883 | A | * | 10/1998 | Archibald et al. | 705/53 |
|---|---|---|---|---|---|
| 7,703,142 | B1 | * | 4/2010 | Wilson et al. | 726/26 |
| 8,200,626 | B1 | * | 6/2012 | Katzer et al. | 707/621 |
| 8,849,864 | B2 | * | 9/2014 | Malik | 707/796 |
| 2003/0154221 | A1 | * | 8/2003 | Caronni et al. | 707/205 |
| 2004/0073789 | A1 | * | 4/2004 | Powers | 713/165 |
| 2011/0035409 | A1 | * | 2/2011 | Shimada et al. | 707/783 |
| 2011/0131115 | A1 | * | 6/2011 | Yamanaka et al. | 705/27.2 |

* cited by examiner

*Primary Examiner* — Michael Pyzocha
(74) *Attorney, Agent, or Firm* — Michael A. Glenn; Perkins Coie LLP

(57) ABSTRACT

A technique adds virtual file anchoring functionality to a platform by mounting a virtual file system ("system") to store an anchor file. Binary code to create and run the system is embedded into a trusted application's binary code. Thus, whenever the trusted application executes, the embedded code ensures the system is validated and started or restarted as required. To interrogate the existence of the anchor, it can be read like any other file. To modify the status of the anchor, the name of the associated file is decorated such that instead of modifying the file, foo, the trusted application modifies a pseudo-file, foo#decoration. The decoration varies for each modification operation. To generate the decoration, the algorithm takes as input a time component, e.g. in the form of the last accessed time field of the parent directory where the secure file anchors files reside, and the name of the anchor.

19 Claims, 6 Drawing Sheets

```
$ ls /dev/shm/FlexNetFs.44047/SFA
bar fred
$ touch /dev/shm/FlexNetFs.44047/SFA/foo
touch: cannot touch '/dev/shm/FlexNetFs.44047/SFA/foo': permission denied
$ decorate foo
Decorated name= /dev/shm/FlexNetFs.44047/SFA/foo#378f1627
$ touch /dev/shm/FlexNetFs.44047/SFA/foo#378f1627
$ ls /dev/shm/FlexNetFs.44047/SFA
bar fred foo
$
$ rm /dev/shm/FlexNetFs.44047/SFA/foo
rm: Cannot remove '/dev/shm/FlexNetFs.44047/SFA/foo': permission denied
$ rm /dev/shm/FlexNetFs.44047/SFA/foo#378f1627
rm: Cannot remove '/dev/shm/FlexNetFs.44047/SFA/foo#378f1627': permission denied
$ decorate foo
Decorated name= /dev/shm/FlexNetFs.44047/SFA/foo#20a4b558
$ rm /dev/shm/FlexNetFs.44047/SFA/foo#20a4b558
$ ls /dev/shm/FlexNetFs.44047/SFA
bar fred
$
```

VIRTUAL FILE-BASED TAMPER RESISTANT REPOSITORY

CROSS REFERENCE TO RELATED APPLICATIONS

This patent application claims the benefit of U.S. Provisional Patent Application Ser. No. 61/933,247, VIRTUAL FILE-BASED TAMPER RESISTANT REPOSITORY, filed Jan. 29, 2014, the entirety of which is incorporated herein by this reference thereto.

BACKGROUND OF THE INVENTION

1. Technical Field

This invention relates generally to the field of computing platforms. More specifically, this invention relates to a new form of a tamper resistant repository on computing platforms.

2. Description of the Related Art

Data security products provide assurance, for example, to software publishers, that a user cannot create, read, write, delete, restore, or copy license rights that are stored on the user's hardware. For example, a repository, such as a file anchor is useful because it can be used to mark an occurrence of a particular event on a system such as for instance the acquisition of a license or the completion of a transaction. Thus, a user may have motivation to tamper with the repository to (1) violate a policy that the data in the repository intends to enforce or (2) remove evidence of an activity that was logged or recorded in the repository. Because the interface to a file system is well defined it is a straight-forward task for a program to interact with a file on the file system which implements a file anchor. The problem on an operating-system is that the simplicity of file input or output (I/O) operations makes an input or output operation easy to detect by monitoring one or more system calls made by a repository-dependent program. For example, a tool can monitor the system calls and detect an input or output operation by a repository-dependent program, which can reveal the location of the corresponding file anchor, hence making the file repository vulnerable to tampering.

BRIEF DESCRIPTION OF THE DRAWINGS

FIG. 4 is an example of a sequence of instructions showing how to create and remove a virtual file anchor, according to an embodiment;

DETAILED DESCRIPTION

Overview

A technique adds virtual file anchoring functionality to a platform by mounting a virtual file system ("system") to store an anchor file. Binary code to create and run the system is embedded into a trusted application's binary code. Thus, whenever the trusted application executes, the embedded code ensures the system is validated and started or restarted as required. To interrogate the existence of the anchor, it can be read like any other file. To modify the status of the anchor, the name of the associated file is decorated such that instead of modifying the file, foo, the trusted application modifies a pseudo-file, foo#decoration. The decoration varies for each modification operation. To generate the decoration, the algorithm takes as input a time component, e.g. in the form of the last accessed time field of the parent directory where the secure file anchors files reside, and the name of the anchor.

For years state of the art designs have included using a non-hidden encrypted file containing license rights that can be arbitrarily large, e.g. a trusted store. Because a trusted store is encrypted, one skilled in the art could be confident that a trusted store cannot be created, read, or written by the user. However, this non-hidden trusted store file can be deleted, restored and copied. The industry has prevented copying a trusted store to another computer by including one or more computer identifiers in the trusted store, e.g. the name of an anchor file, foo, located somewhere on the host machine separate from the trusted store. In the state of the art, to detect restoration and deletion of a trusted store, a trusted store is paired with a number of such anchor files. An anchor typically is a very small piece of data which refers to a trusted store and is hidden from the user, e.g. particular code on a user's computer acting on behalf of the user. For example, if the software of interest, e.g. a licensed program, finds a trusted store but not its corresponding anchors, it is known that the trusted store has been copied, and thus the license has expired and the program will not run. As well, if the modification timestamp/sequence number in the anchor is greater than the modification timestamp/sequence number in its corresponding trusted store, it is known that the trusted store has been restored to an earlier state. This discovery causes the program of interest not to run because the trusted store had been tampered with. The strength of these techniques rely on the ability to hide the anchor, keep the location of the anchor file from being known to a user or client software on the user's computer.

Figure 1:
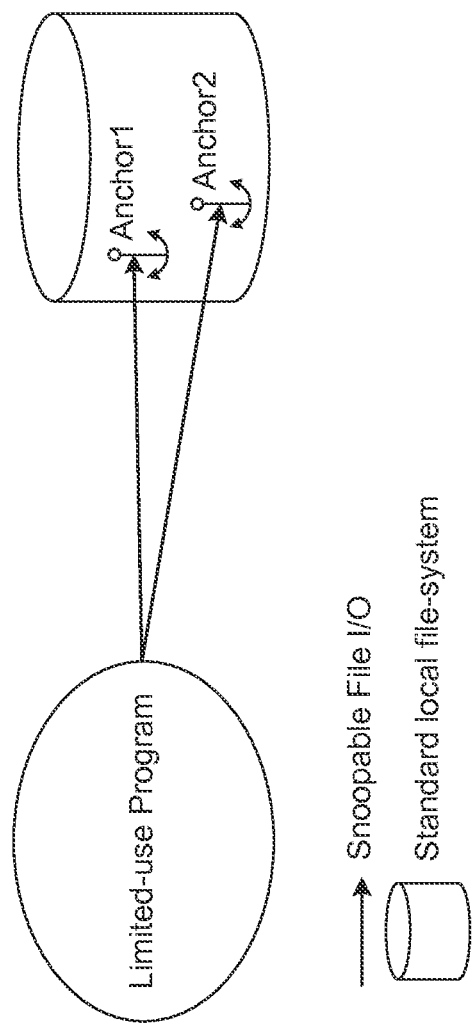
FIG. 1 is a schematic diagram of a limited-used program and two anchor files on a standard local file system, where the two anchor files are capable of being discovered by the use of a snoopable file input or output (I/O) call, according to the prior art.

The prior art technique can be understood with reference to FIG. 1. FIG. 1 illustrates the problem that licensing grants can be exploited via file anchor deletion. An anchor file is created to indicate that an event has taken place, e.g. that a program has been run. The existence of the anchor file can prevent unauthorized program use or reuse. The file anchor can be accessed via the usual file system API. Historic event information can be lost when the anchor file is deleted. Thus, there is a need for the anchor file to be hidden as is possible and as far as possible as the anchor file can be vulnerable to manual deletion. An anchor file must have world access, because in today's global interconnectivity, any user can run the program. Effectively, an anchor file is private to a software component, rather than a user, although descriptions herein may refer to a user instead of the software component. Consequently if an anchor file can be found, it can be deleted without needing special rights. This is because the operating system cannot distinguish between a user making a fraudulent deletion of the anchor file and the licensing software application making a valid deletion. As mentioned above, many operating systems allow a process's file access, e.g. using the snoop utility on Linux, to be snooped. Thus, it is a challenge to keep the location of the file anchor a secret. Consequently, traditional file anchors are weak.

Figure 2:
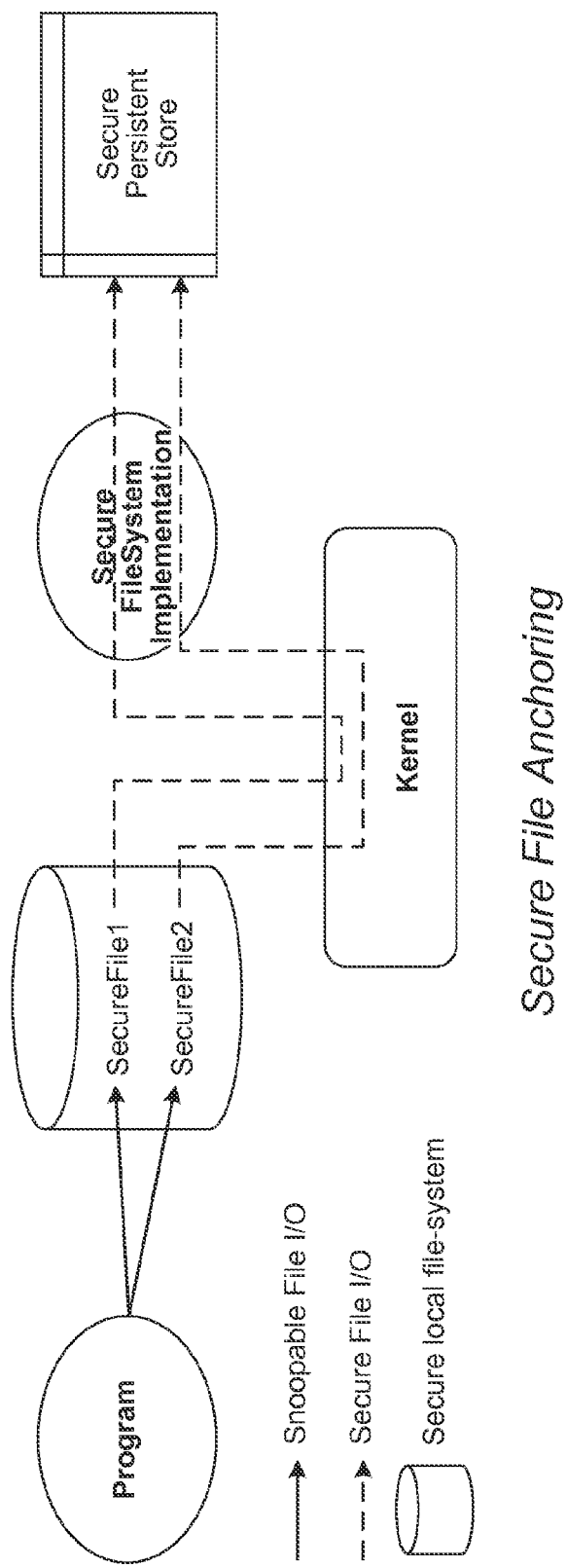
FIG. 2 is a schematic diagram showing a program accessing two virtual anchor files on a secure local file system via a snoopable file I/O operation, which causes a secure file I/O operation to access the two actual file anchors in a secure persistent store via a virtual secure file system implementation, according to an embodiment.

In sharp contrast, the innovation can be described with reference to FIG. 2, a schematic diagram showing a program accessing two virtual anchor files on a secure local file system via a snoopable file I/O operation, which causes a secure file I/O to access the two actual file anchors in a secure persistent store via a virtual secure file system implementation. FIG. 2 illustrates that the anchor file can have world access permission, as any user anywhere in the world can run the trusted program. The virtual file system can choose to override some or all of these permissions. It can demand a filename be decorated to allow a particular file operation, e.g. to delete SecureFile1, the name SecureFile1#<decoration> is required to be used. The decoration algorithm is known only to the trusted application (e.g. Program) and the virtual file system (e.g. Secure FileSystem Implementation). In an embodiment, a decoration is single-use and time-limited. For example, a typical decoration can be SecureFile1#2b304dde and have a lifespan of 100 ms. The virtual file system, e.g. Secure FileSystem Implementation, file I/O cannot be easily snooped since it takes place within the kernel of the operating system. The virtual file system (Secure FileSystem Implementation) content, i.e. what the files in the Secure FileSystem Implementation contain and metadata, such as the names of the files, the directory structure, etc., is persisted in secure, distributed, and redundant locations. This means that the virtual file system is resilient to attempts to remove or alter its content since only the operating system kernel knows how to access it.

An Example Implementation

It has been found that individual license rights are too large to hide using current, prior art methods of hiding. Therefore, an embodiment of the innovation can be used and implemented to create and hide a corresponding, relatively smaller, anchor, which protects a larger trusted store of the license rights.

While embodiments of the invention are discussed herein in connection with a file anchor and a computer that runs an operating system such as the Unix operating system, those skilled in the art will appreciate that the innovation applies broadly to other devices such as servers, desktops, laptops, mobile (e.g. tablets or phones), and special purpose devices, such as networking equipment, medical devices, and machine to machine sensors. Further, the innovation applies to any operating system.

In an embodiment, the data stored in the repository, e.g. the anchor file, can be arbitrary data of arbitrary size. Regardless of type of data and size, the repository cannot be created, read, written, deleted, restored, or copied by the user of the hardware and operating system which contains the repository or by software or firmware authored by or controlled by the user, e.g. hacker tools.

A file system with the characteristics required for the herein disclosed invention can be implemented on any hardware and operating system. An embodiment uses a virtual file system, where a virtual file system is defined to be an abstraction layer on top of the interfaces of a non-virtual file system. For example the Filesystem in Userspace (FUSE) file system is an example of a virtual file system running on top of the interfaces of the non-virtual file system, provided by Linux/UNIX, on servers, desktops, and laptops. Those skilled in the art will appreciate that the innovation is not limited to the FUSE file system, Linux/UNIX, or servers, desktops, and laptops.

In an embodiment, a virtual file anchor is operated on by using the same semantics as used for a file anchor of a non-virtual file system ("non-virtual file anchor"), e.g. when being read. Put another way, the virtual file anchor appears as a typical file on a file system which, itself, appears as a typical file system. The difference with a file that operates on a virtual file anchor is that the virtual file anchor cannot be modified by the file unless its name is decorated with a string known only to a trusted application and to the file system upon which the virtual file anchor resides.

In an embodiment, the specific decoration required to modify a file anchor is generated by an algorithm known only to trusted applications. An attempt to tamper with a virtual file anchor without knowledge of the algorithm fails because the specific decoration is unknown. For example, the decoration can be unknown because the decoration is file-specific, single-use, and/or time limited.

An Exemplary Implementation

Figure 3:
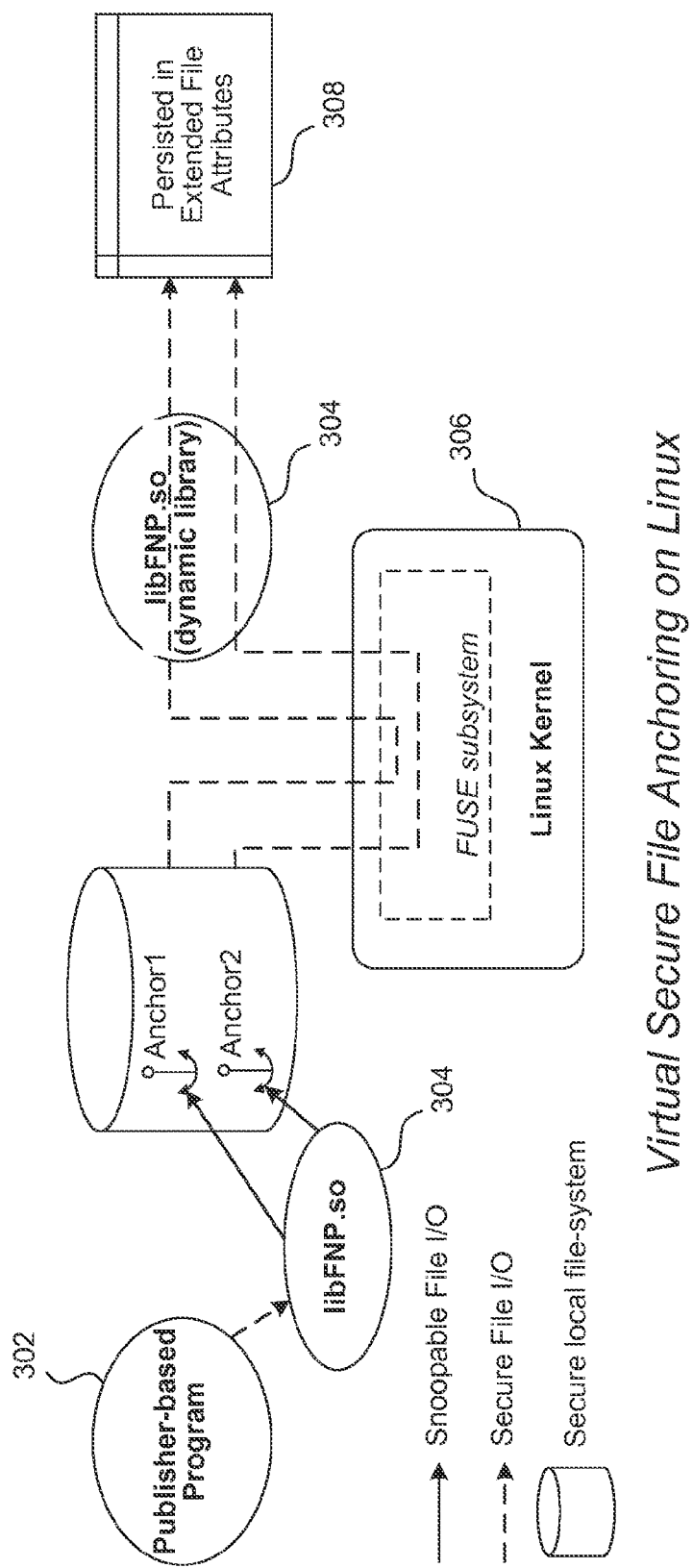
FIG. 3 is a schematic diagram showing a secure file anchoring implementation in a Linux/UNIX environment, according to an embodiment.

An example implementation of an embodiment can be understood with reference to FIG. 3, schematic diagram illustrating secure file anchoring in a Linux/UNIX environment. Publishers build applications 302 using technology, such as for example FlexNet Publisher (FNP), which uses anchor files to control and protect licensing operations. Anchor files have permissions set to full world access, however, the anchor names require decoration for create/modify/delete operations. The decoration algorithm is held within a dynamic library 304, e.g. libFNP.so. Library 304 automatically mounts the virtual secure file-system when necessary, for example to validate its trusted store of license rights. The virtual secure file-system is implemented using the Linux FUSE subsystem 306. File anchor content, that is information such as time of last modification of the trusted store, and metadata, such as the names of the file anchors, is persisted in extended file attributes 308. It should be appreciated that persisted content and metadata can be stored in a variety of ways such as but not limited to into file system superblocks.

FIG. 4 illustrates example usage in a Unix environment. In this example it is assumed that a test command line utility can provide decorated names. The decorated name will typically be generated by algorithmically combining together a set of attributes such as, for example, the current time, the name of the file, and the process identity. The particular algorithm is known only to the secure file system and the trusted application. FIG. 4 illustrates how the innovation allows command line interaction with the virtual file system.

An Exemplary Embodiment

In an embodiment and as mentioned above, virtual file anchoring functionality is added to a platform by mounting a virtual file system to hold the secure anchor files. For example, an embodiment can be implemented in FlexNet Publisher (Linux; "FNP"), a software license manager tool by Flexera Software LLC (Chicago, Ill.). When implemented in FNP, the virtual file system has a name, e.g. is called FlexNetFs, and is built using FUSE functionality readily available on modern Linux releases. Those skilled in the art will appreciate that the innovation is applicable to any operating system and device and is not limited to the particular operating system and devices described herein.

In an embodiment, the binary code to create and run the virtual file system is incorporated into a trusted application's binary code at build time, for example by using a development toolkit, e.g. standard Flexera FNP. Customers do not interact with any virtual secure file system components directly. Hence whenever the trusted application executes the embedded code, the trusted application via the embedded code can ensure the virtual file system is validated and started or restarted as required.

When the application, i.e. the embedded code in the application, executes and interrogates the existence of an anchor, the anchor file (e.g. foo) is read by the embedded code as any other file is read.

To operate on the anchor file, e.g. to modify the status of an anchor file, for example to record the utilization of the license right, the name of the associated file is decorated. Thus, instead of writing to a file, e.g. foo, the application writes to a decorated version of the file, a pseudo-file, e.g. foo#decoration. In an embodiment, the actual decoration varies for each operation, such as the write operation. It should be appreciated that in accordance with the embodiment a file called foo#decoration actually does not exist. As will be shown below, any successful file operation performed on foo#decoration actually affects foo.

In an embodiment, to generate the decoration, the algorithm takes as input a time component, e.g. in the form of the last accessed time field of the parent directory where the virtual file anchors files reside, and the name of the anchor. Subsequently, the algorithm generates and outputs the decoration string.

Example

File I/O Flow in Licensing

Figure 5:
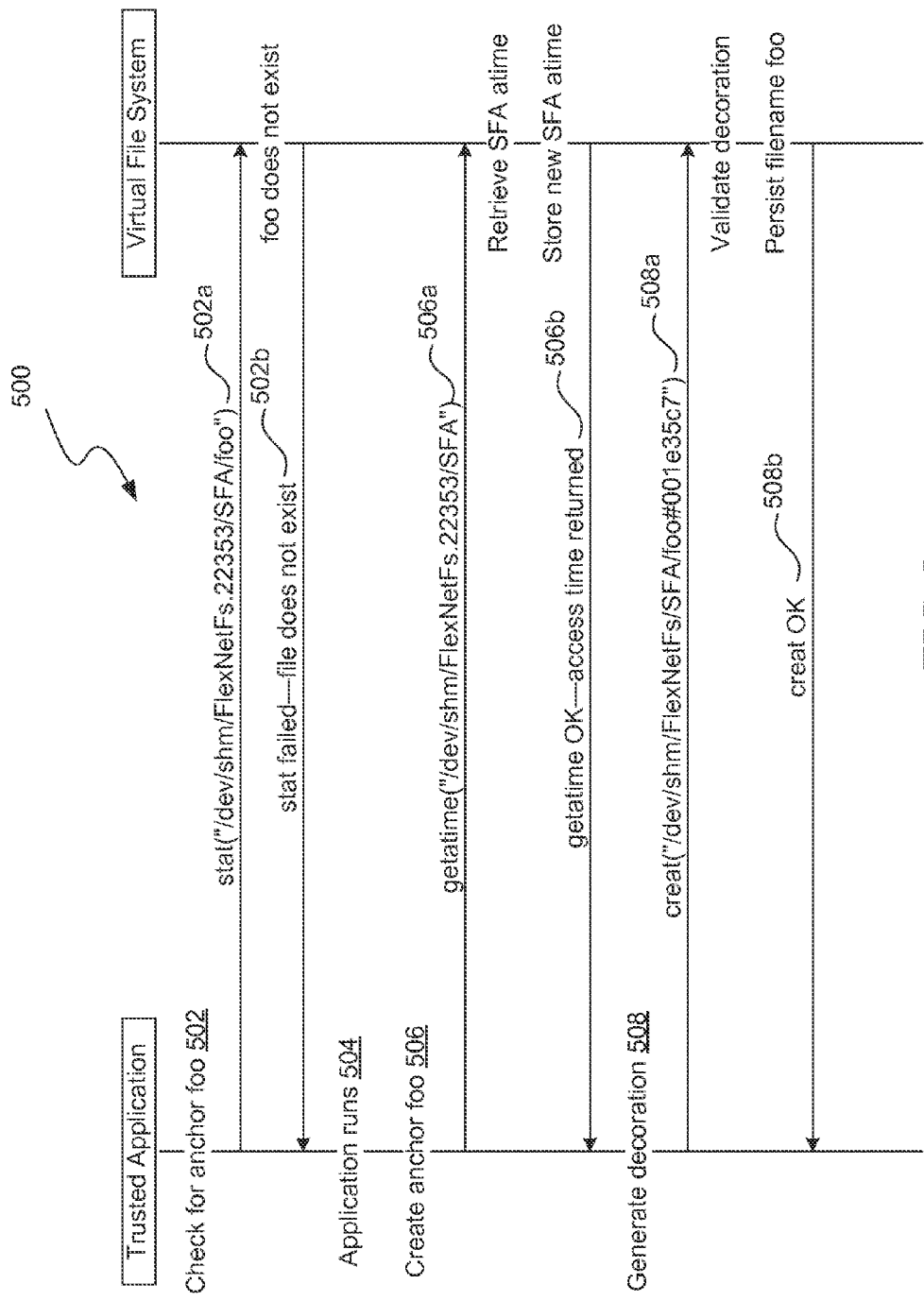
FIG. 5 is a flow diagram showing an example of interactive operations between a trusted application and the virtual file system, according to an embodiment.

An embodiment can be understood with reference to FIG. 5, a flow diagram 500 showing an example of interactive operations between a trusted application and the virtual file system concerning a virtual file anchor called foo. In the example the trusted application is a once-only trial program and it is assumed that the existence of anchor foo implies that the particular once-only trial program has already been run on the customer's machine.

In the example, it is also assumed that the mount-point for the virtual file system is /dev/shm/FlexNetFs.22353 and that the virtual anchor file resides in a directory called SFA. The mount-point location, in /dev/shm, is predefined for secure file anchors and the directory name, FlexNetFs.22353, is generated by appending a random number to the string "FlexNetFs."

In this example, the trusted application, i.e. the once-only trial program, determines whether to run based upon the existence of the anchor. If the anchor exists, the once-only trial program determines not to run.

At step 502, the trusted application checks whether the file, foo, exists at the virtual file system. In the implementation shown, the trusted application sends the following file operation to the virtual file system (step 502a): stat("/dev/shm/FlexNetFs.22353/SFA/foo"). Because the file, foo, does not exist, the virtual file system returns the file operation, stat failed—file does not exist (step 502b).

Because the trusted application received the message that the anchor file does not exist, the trusted application can run (step 504).

Because the trusted application was able to run, the embedded code within causes the anchor file, foo, to be created (step 506). More specifically, the trusted application sends the operation to get a timestamp of the directory, getatime("/dev/shm/FlexNetFs.22353/SFA"), to the virtual file system (step 506a). The virtual file system accesses the known directory SFA and retrieves the timestamp from that access, i.e. SFA atime (step 506b). Subsequently, the virtual file system stores the new SFA atime in a persistent store (not shown). The SFA atime is used by the secure file decoration algorithm to generate the correct decoration. After successfully retrieving SFA atime and storing the new SFA atime, the virtual file system sends a confirmation message, e.g. getatime OK, and returns the access time to the trusted application (step 506b).

After receiving the access time, the trusted application can use it to generate the corresponding decoration for the anchor file (step 508). Specifically, the trusted application sends a command to generate the decoration using the access time (step 508a), e.g. creat("/dev/shm/FlexNetFs/SFA/foo#001e35c7"). Responsive to receiving the command to create the file, the virtual file system validates that the decoration appended to the filename matches the expected decoration for that filename. Subsequent to validating the decoration, the virtual file system stores the filename, foo, (not the decorated file name) in the persistent storage (not shown).

At step 508b, the virtual file system sends a confirmation message to the trusted application to confirm that the anchor file has been created and stored.

Thereafter a file called foo exists in /dev/shm/FlexNetFs.22353/SFA.

Any subsequent execution of the trusted application detects the presence of /dev/shm/FlexNetFs.22353/SFA/foo and refuses to run. In this example, the trusted application would send the command, stat("/dev/shm/FlexNetFs.22353/SFA/foo"), and would receive a successful stat, causing the trusted application not to run.

The vulnerability of a traditional file anchor is that, once detected, it could simply be deleted, resulting in the application running for a second time. In contrast, with the innovation, an attempt to delete the anchor file, /dev/shm/FlexNetFs.22353/SFA/foo, would fail, possibly resulting in a type of "permission denied" error. One skilled in the art would readily appreciate that the virtual file system can be configured such that other operations such as but not limited to create, read, write, restore, or copy can also result in a failed operation, possibly resulting in a "permission denied" type error.

It should be appreciated that a random mount-point is used for the virtual file system, e.g. /dev/shm/FlexNetFs.22353. Here, the extension, 22353, is randomly generated. On the contrary, if the file system is mounted at a fixed point, e.g. /dev/shm/FlexNetFs, then prior to running the trusted application an unscrupulous user can mount their own spoof file system at that location. This would effectively block the mounting of the virtual secure file system and hence prevent its use in generating secure file anchors files. To avoid this exploit, a random string or digits or combination thereof is incorporated into the mount-point name, e.g. as an extension, every time the virtual file system gets restarted. Faced with competing spoof mount-points, the algorithm in the trusted application is able to deduce which is the genuine virtual file system by issuing a set of file operations, some with valid decorations which should pass and some with invalid decorations which should fail. Only the genuine virtual file system, such as for example FlexetNet Secure Filesystem, knows the algorithm to generate the correct filename decorations.

Another embodiment in which a secure anchor file can be used is in the prevention of a "roll-back" exploit. For example, suppose a trusted store contains ten unused licenses, at which point a backup snap-shot of the store is taken. Suppose further that subsequently five of the ten licenses are issued from the trusted store. The trusted store can then be returned to its original state using the backup snap-shot taken, meaning there are once again ten licenses available in the store, plus the five already issued. This exploit can be avoided by maintaining a transaction number in a secure file anchor, as follows. Suppose that when the trusted store was backed-up the transaction number was X. In the embodiment, the value X is held both in the transaction store and in a secure file anchor. When a license is issued that number is incremented. For instance, after five licenses have been issued, both the trusted store and the secure file anchor contain the number X+5. Thus, if and when the trusted store is reverted to its original state it will once again contain ten licenses and the transaction number X, yet the secure file anchor will still contain the transaction number X+5. This discrepancy in the transaction number can be detected by the trusted application. The trusted application in turn can mark the trusted store as compromised, e.g. "untrusted," and hence prevent any further licenses from being granted, thus preventing the exploit.

An Example Machine Overview

Figure 6:
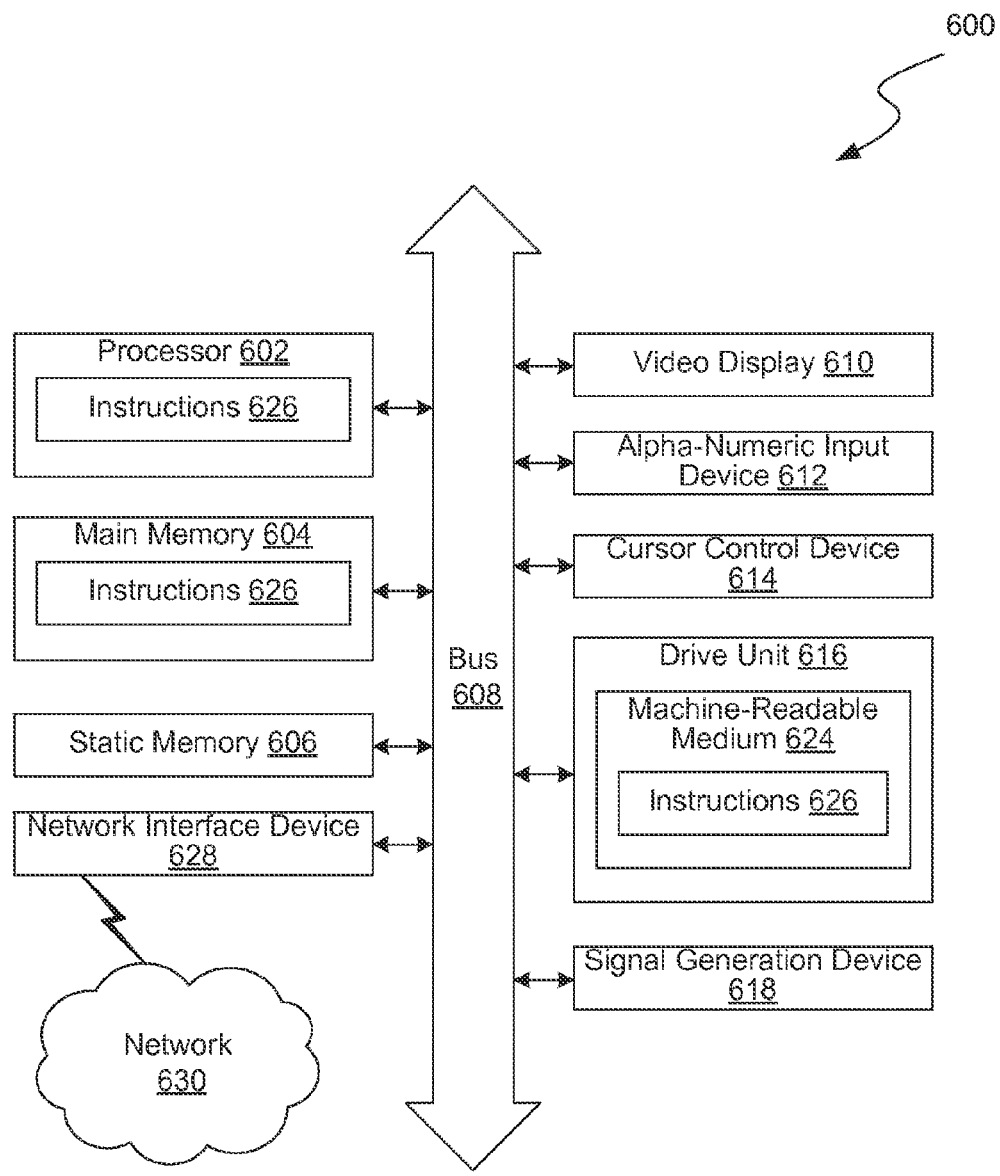
FIG. 6 is a block schematic diagram of a system in the exemplary form of a computer system according to an embodiment.

FIG. 6 is a block schematic diagram of a system in the exemplary form of a computer system 600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 600 includes a processor 602, a main memory 604 and a static memory 606, which communicate with each other via a bus 608. The computer system 600 may further include a display unit 610, for example, a liquid crystal display (LCD) or a cathode ray tube (CRT). The computer system 600 also includes an alphanumeric input device 612, for example, a keyboard; a cursor control device 614, for example, a mouse; a disk drive unit 616, a signal generation device 618, for example, a speaker, and a network interface device 628.

The disk drive unit 616 includes a machine-readable medium 624 on which is stored a set of executable instructions, i.e. software, 626 embodying any one, or all, of the methodologies described herein below. The software 626 is also shown to reside, completely or at least partially, within the main memory 604 and/or within the processor 602. The software 626 may further be transmitted or received over a network 630 by means of a network interface device 628.

In contrast to the system 600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to make or use a virtual file-based tamper resistant repository on such internet-enabled or other network-enabled devices, servers, or clients. It further should be appreciated that one or more cloud computing embodiments include making or using a virtual file-based tamper resistant repository using mobile devices, tablets, and the like, as such devices are becoming standard consumer devices.

Although the innovation is described herein with reference to one or more embodiments, one skilled in the art will readily appreciate that other applications may be substituted for those set forth herein without departing from the spirit and scope of the present innovation. Accordingly, the invention should only be limited by the Claims included below.

The invention claimed is:

1. A computer-implemented method for creating and using a virtual file-based tamper resistant repository, comprising:
   running code embedded in a trusted application, the embedded code creating and running a virtual file system;
   sending, by the embedded code, a command to the virtual file system to check the presence of an anchor file in a predefined directory of a persistent store that is communicably coupled to the virtual file system;
   when the anchor file is present, the embedded code causing the trusted application not to continue to execute or not to run an application of interest;
   when the anchor file is not present, the embedded code:
      sending a command to the virtual file system to return a current access time of the predefined directory; wherein the command causes the virtual file system to store the directory access time to the persistent store;
      responsive to receiving the directory access time, the embedded code using the directory access time and a known name of the anchor file as input and generating therefrom a unique decoration string intended for the anchor file;
      adding, by the embedded code, the unique decoration string to the name of the anchor file to create a decorated anchor file name; and
      sending, by the embedded code, the decorated anchor file name to the virtual file system, causing the virtual file system to validate the decorated anchor file name and to store a decorated anchor file of the same name in the persistent store;

wherein one or more steps are performed on at least a processor coupled to at least a memory.

2. The method of claim 1, wherein the embedded code checks for a plurality of anchor files in the predefined directory, knows the name of each anchor file, and generates a unique decoration string for each anchor file.

3. The method of claim 1, wherein the creation of the decorated anchor file represents acquisition of a license or completion of a transaction, each regarding the application of interest or the trusted application.

4. The method of claim 1, wherein the embedded code is incorporated into the trusted application's code at build time of the trusted application.

5. The method of claim 1, wherein the decoration varies for each operation.

6. The method of claim 5, wherein an operation is any of: create, read, write, restore, or copy.

7. The method of claim 1, wherein the embedded code, using the directory access time and a known name of the anchor file as input and generating therefrom a unique decoration string intended for the anchor file, uses a decoration algorithm that is known only to the trusted application and the virtual file system.

8. The method of claim 1, wherein the decoration is single-use and time-limited.

9. The method of claim 1, wherein the virtual file system file input and output takes place within a kernel of an operating system of the computing environment.

10. The method of claim 1, wherein content of the virtual file system is persisted in secure, distributed, and redundant locations.

11. The method of claim 10, wherein the content comprises contents of files and metadata, the metadata including names of the files and directory structure of the virtual file system.

12. The method of claim 1, wherein the virtual file system is an abstraction layer on top of interfaces of a non-virtual file system.

13. The method of claim 7, wherein the decoration algorithm is held within a dynamic library.

14. The method of claim 1, wherein file anchor content, comprising time of last modification of a trusted store, and metadata, comprising names of file anchors, is persisted in extended file attributes.

15. The method of claim 1, wherein a random mount-point is used to mount the virtual file system where the random mount-point is generated by incorporating a random string or digits or combination thereof into a mount-point name every time the virtual file system is restarted.

16. The method of claim 1, wherein the trusted application deduces which is the genuine virtual file system by issuing a set of file operations, some with valid decorations which should pass and some with invalid decorations which should fail and wherein only the virtual file system knows the algorithm to generate the correct filename decorations.

17. The method of claim 1, further comprising:
maintaining a transaction number in the file anchor and in a trusted store;
incrementing the transaction number in the file anchor and in the trusted store when a license is issued;
taking a backup snap-shot of the trusted store at a point in time;
at a later point in time, using the backup snap-shot, reverting the trusted store to its state at the time of the backup snap-shot;
after reverting the trusted store, comparing the transaction number in the reverted trusted store with the transaction number in the file anchor and when there is discrepancy in the compared transaction numbers, marking the trusted store as compromised.

18. A system for creating and using a virtual file-based tamper resistant repository, comprising:
a processor operable to execute computer program instructions; and
a memory operable to store computer program instructions executable by the processor, for performing:
running code embedded in a trusted application, the embedded code creating and running a virtual file system;
sending, by the embedded code, a command to the virtual file system to check the presence of an anchor file in a predefined directory of a persistent store that is communicably coupled to the virtual file system;
when the anchor file is present, the embedded code causing the trusted application not to continue to execute or not to run an application of interest;
when the anchor file is not present, the embedded code:
sending a command to the virtual file system to return a current access time of the predefined directory; wherein the command causes the virtual file system to store the directory access time to the persistent store;
responsive to receiving the directory access time, the embedded code using the directory access time and a known name of the anchor file as input and generating therefrom a unique decoration string intended for the anchor file;
adding, by the embedded code, the unique decoration string to the name of the anchor file to create a decorated anchor file name; and
sending, by the embedded code, the decorated anchor file name to the virtual file system, causing the virtual file system to validate the decorated anchor file name and to store a decorated anchor file of the same name in the persistent store.

19. A non-transitory computer-readable digital storage medium having stored thereon a computer program having a program code for performing, when running on a computer or microprocessor, a method for:
running code embedded in a trusted application, the embedded code creating and running a virtual file system;
sending, by the embedded code, a command to the virtual file system to check the presence of an anchor file in a predefined directory of a persistent store that is communicably coupled to the virtual file system;
when the anchor file is present, the embedded code causing the trusted application not to continue to execute or not to run an application of interest;
when the anchor file is not present, the embedded code:
sending a command to the virtual file system to return a current access time of the predefined directory; wherein the command causes the virtual file system to store the directory access time to the persistent store;
responsive to receiving the directory access time, the embedded code using the directory access time and a known name of the anchor file as input and generating therefrom a unique decoration string intended for the anchor file;
adding, by the embedded code, the unique decoration string to the name of the anchor file to create a decorated anchor file name; and sending, by the embedded code, the decorated anchor file name to the virtual file system, causing the virtual file system to validate the decorated anchor file name and to store a decorated anchor file of the same name in the persistent store.

* * * * *